(12) United States Patent
Saito (10) Patent No.: US 8,659,410 B2
(45) Date of Patent: Feb. 25, 2014

(54) VEHICLE STATUS DISPLAY APPARATUS OF HYBRID VEHICLE

(75) Inventor: Kan Saito, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 97 days.

(21) Appl. No.: 13/486,421

(22) Filed: Jun. 1, 2012

(65) Prior Publication Data

US 2013/0038439 A1 Feb. 14, 2013

Related U.S. Application Data (63) Continuation of application No. PCT/JP2011/068072, filed on Aug. 8, 2011.

(51) Int. Cl.
*B60Q 1/00* (2006.01)

(52) U.S. Cl.
USPC .................. 340/439; 180/65.21; 180/65.1

(58) Field of Classification Search
USPC ................ 340/439; 180/65.1, 65.21
See application file for complete search history.

(56) References Cited

U.S. PATENT DOCUMENTS

| | | | | |
|---|---|---|---|---|
| 6,092,021 | A * | 7/2000 | Ehlbeck et al. | 701/123 |
| 6,532,926 | B1 * | 3/2003 | Kuroda et al. | 123/179.4 |
| 6,600,413 | B1 * | 7/2003 | Lo | 340/439 |
| 7,013,205 | B1 * | 3/2006 | Hafner et al. | 701/22 |
| 7,898,405 | B2 * | 3/2011 | Burke et al. | 340/461 |
| 2009/0125173 | A1 * | 5/2009 | Komatsu et al. | 701/22 |
| 2011/0227716 | A1 * | 9/2011 | Lucas | 340/439 |
| 2011/0241864 | A1 * | 10/2011 | Fujiki et al. | 340/439 |
| 2012/0176231 | A1 * | 7/2012 | Skaff et al. | 340/439 |

FOREIGN PATENT DOCUMENTS

| | | | |
|---|---|---|---|
| JP | 2007-125921 A | 5/2007 | |
| JP | 2010-030536 A | 2/2010 | |
| JP | 2010-285091 A | 12/2010 | |
| JP | 2011-057115 A | 3/2011 | |

OTHER PUBLICATIONS

International Search Report issued Oct. 18, 2011 in PCT/JP2011/068072 filed Aug. 8, 2011.

Written Opinion issued Oct. 18, 2011 in PCT/JP2011/068072 filed Aug. 8, 2011.

* cited by examiner

*Primary Examiner* — Eric M Blount
(74) *Attorney, Agent, or Firm* — Oblon, Spivak, McClelland, Maier & Neustadt, L.L.P.

(57) ABSTRACT

A vehicle status display apparatus for a hybrid vehicle includes a display configured to output a display related to a threshold indicating an engine start criterion under a traveling status using an electric motor; and a processing device. When the threshold changes, the processing device changes the display due to the change of the threshold such that a change manner of the display in a case where the threshold changes due to an operation of a vehicle's occupant is different from a change manner of the display in a case where the threshold changes due to a factor other than the operation of the vehicle's occupant.

16 Claims, 5 Drawing Sheets

VEHICLE STATUS DISPLAY APPARATUS OF HYBRID VEHICLE

CROSS-REFERENCE TO RELATED APPLICATIONS

This is a continuation of International Application No. PCT/JP2011/068072, filed on Aug. 8, 2011, the entire contents of which are hereby incorporated by reference.

FIELD

The present disclosure is related to a vehicle status display apparatus of a hybrid vehicle.

BACKGROUND

JP 2010-30536 A discloses this kind of an apparatus. According to the disclosed apparatus, an economy drive status amount is visualized as a relative amount with respect to an engine start threshold.

However, the engine start threshold can be determined by various factors, and there may be a case where the engine start threshold greatly changes according to a factor not due to an operation of a vehicle's occupant (a driver, in particular). For example, there is a case where the engine start threshold greatly changes to promote the engine start for preservation of a battery when a temperature of the battery becomes high. In such a case, if a display related to the engine start threshold greatly changes due to a great change of the engine start threshold, it induces confusion in the driver, because the driver cannot understand its meaning. Further, if the display related to the engine start threshold changes not due to the operations of the driver, it may disturb the operations of the driver who intends to drive the vehicle within a range in which the engine does not start.

Therefore, an object of the present invention is to provide a vehicle status display apparatus of a hybrid vehicle which can reduce inconvenience induced in the case where the engine start threshold changes not due to the operations of the vehicle's occupant.

SUMMARY

In order to achieve the aforementioned objects, according to the first aspect a vehicle status display apparatus is provided, which includes
a display configured to output a display related to a threshold indicating an engine start criterion under a traveling status using an electric motor; and
a processing device configured to, when the threshold changes, change the display due to the change of the threshold such that a change manner of the display in a case where the threshold changes due to an operation of a vehicle's occupant is different from a change manner of the display in a case where the threshold changes due to a factor other than the operation of the vehicle's occupant.

DESCRIPTION OF EMBODIMENTS

In the following, the best mode for carrying out the present invention will be described in detail by referring to the accompanying drawings.

Figure 1:
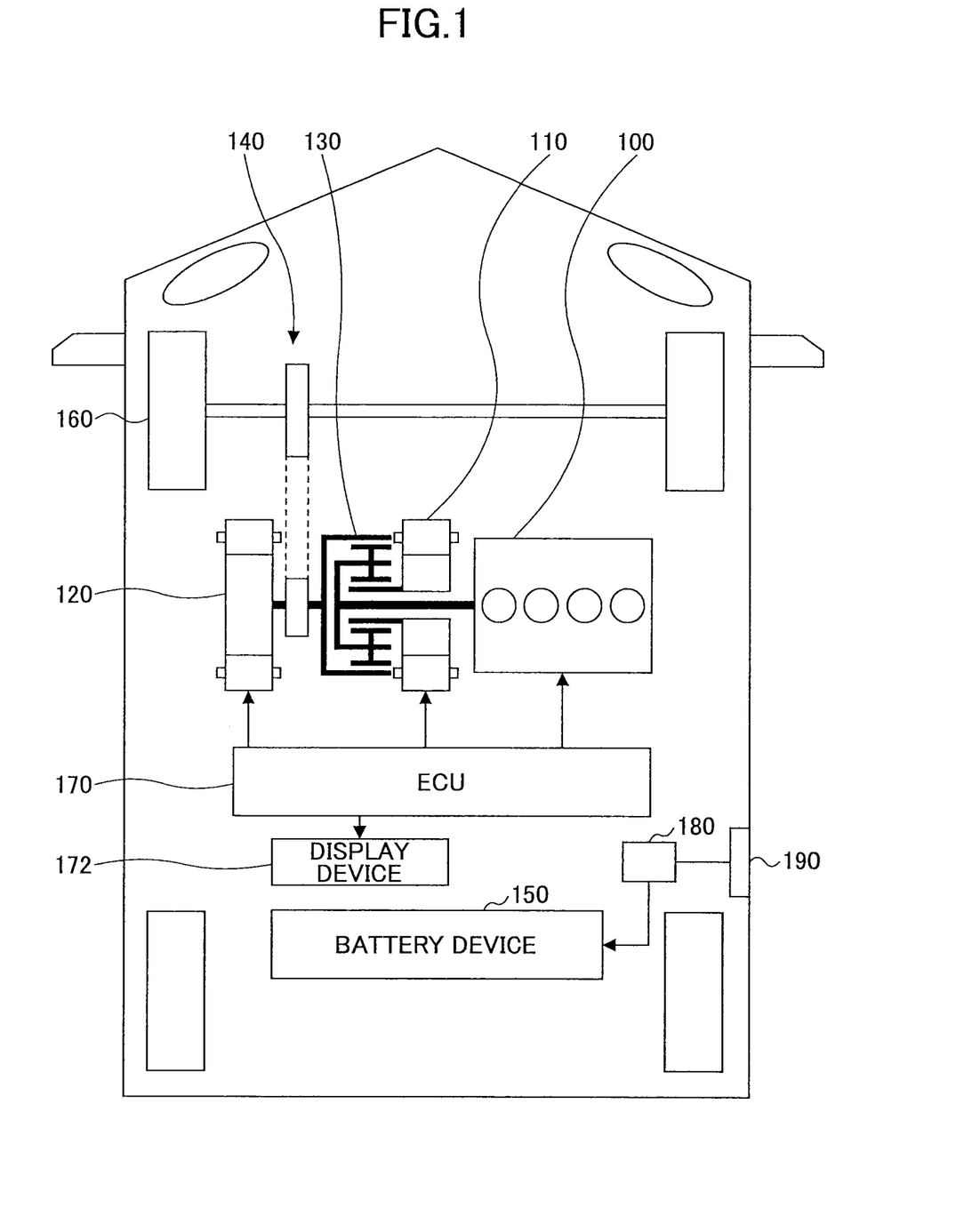
FIG. 1 is a diagram for illustrating an example of a configuration of a hybrid vehicle.

FIG. 1 is a diagram for illustrating an example of a configuration of a hybrid vehicle. The hybrid vehicle includes an engine 100, a first MG (Motor-Generator) 110, a second MG 120, a power splitter 130, a reduction gear 140, a battery 150, drive wheels 160, an ECU (Electronic Control Unit) 170, and a display 172. Further, in the illustrated embodiment, the hybrid vehicle is a so-called plug-in hybrid vehicle, and includes a battery charging apparatus 180 and a charge inlet 190.

The engine 100, the first MG 110 and the second MG 120 are coupled to the power splitter 130. The hybrid vehicle is driven with a driving force from at least one of the engine 100 and the second MG 120. The power generated by the engine 100 is divided to be transmitted in two paths by the power splitter 130. Specifically, one path is to the drive wheels 160 via the reduction gear 140, and another path is to the first MG 110.

The first MG 110 is an AC motor, such as a three-phase motor. The first MG 110 generates electricity using the power of the engine 100 divided by the power splitter 130. Specifically, when a SOC (State of Charge) of the battery 150 is decreased, the engine 100 starts to cause the first MG 110 to generate electricity. Then, the electric power generated by the first MG 110 is converted from AC to DC and then a voltage thereof is adjusted by a converter such that electric power can be accumulated in the battery 150.

The second MG 120 is an AC motor, such as a three-phase motor. The second MG 120 generates a driving force using at least one of electric power accumulated in the battery 150 and electric power generated by the first MG 110. The driving force of the second MG 120 is transmitted to the drive wheels 160 via the reduction gear 140. In this way, the second MG 120 assists the engine 100 and generates the driving force for driving the vehicle. It is noted that in FIG. 1 the drive wheels 160 are front wheels; however, in addition to or instead of the front wheels, rear wheels may be driven by the second MG 120.

It is noted that at the time braking of the vehicle, etc., the second MG 120 is driven by the drive wheel 160 via the reduction gear 140 and the second MG 120 operates as a generator. In this way, the second MG 120 generates a regenerative brake by which braking energy is converted to electric energy. The electric power generated by the second MG 120 is accumulated in the battery 150.

The power splitter 130 may be a planetary gear set which includes a sun gear, pinion gears, a carrier and a ring gear. The pinion gears are engaged with the sun gear and the ring gear. The carrier supports the pinion gears such that the pinion gears can rotate on their axes, and is coupled to a crank shaft of the engine 100. The sun gear is coupled to the rotation shaft of the first MG 110. The ring gear is coupled to the rotation shaft of the second MG 120 and the reduction gear 140.

The battery 150 is a rechargeable DC power supply including a secondary battery, such as a nickel-hydrogen battery and a lithium-ion battery. The voltage of the battery 150 may be about 200 V, for example. In addition to the electric power generated by the first MG 110 and the second MG 120, electric power supplied from an external power supply out of the vehicle is accumulated in the battery 150. It is noted that the battery 150 may be a capacitor with a great capacity. The battery 150 may be any electric power buffer which can temporally accumulate the electric power generated by the first MG 110 and the second MG 120 and the electric power supplied from the external power supply, and supply the accumulated electric power to the second MG 120.

The ECU 170 may be configured by an arbitrary software resource, an arbitrary hardware resource and any combination thereof. The ECU 170 may be implemented by a microprocessor that includes a CPU, a ROM, a RAM, etc., (not shown) which are interconnected via appropriate buses. The ECU 170 performs switching between traveling modes. Typically, the ECU 170 controls the switching between a traveling mode (referred to as "electric traveling mode" hereinafter) in which the engine 100 stops and traveling is implemented using the second MG 120 only and a traveling mode (referred to as "engine traveling mode" hereinafter) in which the engine 100 and the first MG 110 are operated to drive the vehicle while the electric power is generated using kinetic energy generated by the engine 100. The ECU 170 controls the operations of the engine 100, the first MG 110 and the second MG 120 according to the traveling mode. Further, the ECU 170 controls the display 172 as described hereinafter. It is noted that the function of the ECU 170 may be implemented by plural ECUs in cooperation.

The display 172 is coupled to the ECU 170. It is noted that this connection may be a wired connection or a wireless connection, and may be an indirect connection or a direct connection. The display 172 outputs displays associated with a threshold (i.e., an engine start threshold) which expresses an engine start criterion during the electric traveling mode. The display 172 may take the form of a meter or an indicator. Further, the display 172 may be a display such as a liquid crystal display. A way of displaying the engine start threshold on the display 172 is arbitrary. For example, the engine start threshold may be displayed in such a manner that the engine start threshold can be contrasted with the current value of a parameter which is to be compared with the engine start threshold. An example of the way of displaying the engine start threshold is described hereinafter.

The battery charging apparatus 180 converts the electric power, which is supplied from the external power supply (not illustrated) and inputted to the charge inlet 190, to a predetermined charge voltage. The electric power whose voltage is converted by the battery charging apparatus 180 is supplied to the battery 150 and is accumulated as an electric charge in the battery 150. The battery charging apparatus 180 is an AC/DC converter, for example. The charge inlet 190 is an electric power interface for receiving the electric power from the external power supply and is configured such that it can be connected to a charge cable which is connected to the external power supply.

In the following, the engine start threshold (a control threshold) will be described. The engine start threshold is such a threshold that if a certain parameter exceeds it during the electric traveling mode, the engine start operation is performed. Typically, the parameter is related to a propulsion force of the vehicle, and is associated with a drive demand amount determined based on an operation amount of an accelerator pedal by the driver. For example, the parameter may be a demanded torque, a demanded driving force, demanded power, etc., and a dimension of a physical amount thereof is arbitrary. In the following, for the sake of convenience in terms of preventing complexity of the explanation, it is assumed that the parameter is the demanded power (traveling power).

Figure 2:
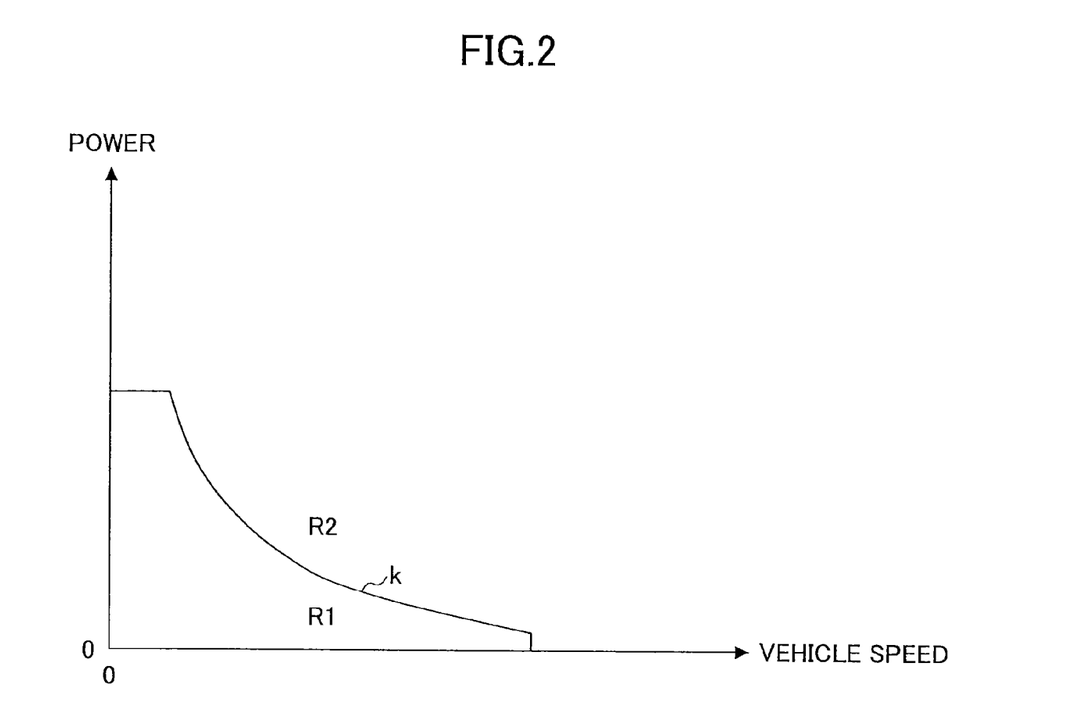
FIG. 2 is a diagram for illustrating an example of an engine start threshold.

FIG. 2 is a diagram for illustrating an example of the engine start threshold. In FIG. 2, a curve k representing the engine start threshold is illustrated with a horizontal axis of vehicle speed and a vertical axis of power. In other words, in the example illustrated in FIG. 2, the engine start threshold is defined as a two dimensional map using the vehicle speed as a parameter. In this case, if a point defined by the current vehicle speed (which is detected by a wheel speed sensor, for example) and the current demanded power (which is determined based on an accelerator opening degree, moves from a region R1 to a region R2 which is delimited by the curve k representing the engine start threshold, the engine start criterion is met and thus the engine 100 is started. In other words, the engine start threshold is power on the curve k associated with the current vehicle speed, and when the current demanded power exceeds this power, the engine start criterion is met and thus the engine traveling mode is started.

It is noted that in fact there are various parameters other than the vehicle speed which determine the engine start threshold. The parameters which determine the engine start threshold can be a first type of a parameter (referred to as a first type parameter) which changes directly due to the operation of the driver and a second type of a parameter (referred to as a second type parameter) which changes not directly due to the operation of the driver. For example, the vehicle speed is a first type parameter because it changes due to the accelerator operation, the braking operation, etc., of the driver.

The first type parameters include a status of an air conditioner (on/off status, a set temperature, a set blower amount, power consumption, etc.), a status of a shift lever (a D range, a third range, etc.) and a status of a drive mode (a normal mode, a sport mode, etc.), for example. For such first type parameters other than the vehicle speed, a map such as illustrated in FIG. 2 may be prepared on a status basis. For example, a map (a curve of the engine start threshold) in the case of the air conditioner in its ON status and a map (a curve of the engine start threshold) in the case of the air conditioner in its OFF status are prepared separately. In this case, if the status of the air conditioner is switched between the ON status and the OFF status, the engine start threshold may be determined by changing the map accordingly. Similarly, a map (a curve of the engine start threshold) in the case of the shift lever in the D range and a map (a curve of the engine start threshold) in the case of the shift lever in the third range are prepared separately. In this case, if the shift lever is switched between the D range and the third range, the engine start threshold may be determined by changing the map accordingly. Similarly, a map of the engine start threshold for the normal mode and a map of the engine start threshold for the sport mode are prepared separately. In this case, if the drive mode is switched between the normal mode and the sport mode, the engine start threshold may be determined by changing the map accordingly.

Typically, the second type parameter is set in terms of protection of parts. For example, the second type parameters may include a temperature of the first MG 110, a temperature of the second MG 120, a temperature of the battery 150, and temperatures of respective inverters (not illustrated) for driving the first MG 110 and the second MG 120. For the second type parameters, a map such as illustrated in FIG. 2 may be prepared on a status basis. For example, a map (a curve of the engine start threshold) may be prepared separately for each of three statuses which include a status where the temperature of the second MG 120 is high enough to exceed a predetermined temperature, a status where the temperature of the second MG 120 is low enough to be lower than a predetermined temperature, and a status other than the previous two statues. In this case, the map is changed according to the change in the temperature of the second MG 120.

Further, the second type parameters include the SOC. In this case, for example, a map (a curve of the engine start threshold) may be prepared separately for three statuses which respectively include a status where the SOC is high enough to exceed a predetermined SOC, a status where the SOC is low enough to be lower than a predetermined SOC, and a status other than the previous two statues. In this case, the map is changed according to the change of the SOC.

It is noted that plural maps are used simultaneously. In this case, the most strict engine start threshold (which leads to the engine start most easily) of the engine start thresholds which are determined based on the respective maps may be adopted. Further, there are various ways of determining the engine start threshold as described above. For example, instead of using several maps as described above, other parameters (the first type and second type parameters) may be considered by applying correction coefficients to the fundamental map (the fundamental curve of the engine start threshold) such as illustrated in FIG. 2.

Figure 3:
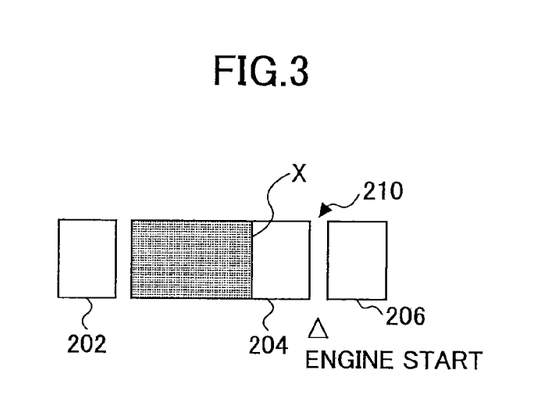
FIG. 3 is a diagram for illustrating an example of a way of displaying the engine start threshold on a display 172.

FIG. 3 is a diagram for illustrating an example of a way of displaying the engine start threshold on the display 172. In the example illustrated in FIG. 3, the display 172 includes three display areas 202, 204 and 206. The display area 202 indicates power recovered by the regenerative brake by the second MG 120. The display area 204 indicates the demanded power for the second MG 120. The display area 206 indicates the traveling power (i.e., the traveling power in the engine traveling mode) at the time when the engine 100 is operating. It is noted that the right end of the display area 204 (i.e., a boundary portion between the display area 204 and the display area 206) becomes information on the engine start threshold.

Here, the display area 204 is described mainly. The display area 204 may be any area which represents a variation of the engine start threshold; however, it is preferable that the display area 204 indicates a relationship between the engine start threshold and the demanded power (and the variation thereof), as illustrated in FIG. 3.

In FIG. 3, a relationship between a position of a bar end X and a boundary portion 210 indicates a relationship between the demanded power and the engine start threshold. Specifically, the right end portion of the bar (referred to as "bar end X" hereinafter) in the display area 204 indicates information related to the demanded power for the second MG 120. The position of the bar end X in the display area 204 is determined according to a ratio of the demanded power to a display threshold (described hereinafter). Specifically, the position of the bar end X in the display area 204 is determined such that when the ratio increases from 0 percent to 100 percent it moves from the left end to the right end accordingly. For example, if the ratio of the demanded power to the display threshold is 90 percent, the position of the bar end X is set at the length of 90 percent of the display area 204 in a lateral direction from the left end, and if the ratio of the demanded power to the display threshold is 10 percent, the position of the bar end X is set at the length of 10 percent of the display area 204 in a lateral direction from the left end. Further, if the ratio of the demanded power to the display threshold is 100 percent, the position of the bar end X is set at the length of 100 percent of the display area 204 in a lateral direction from the left end, that is to say, at the right end of the display area 204 (i.e., the position of the boundary portion 210). Thus, a driver understands that the engine 100 is started if the bar end X moves in the right direction and reaches or goes beyond the right end of the display area 204, that is to say, the boundary portion 210 between the display area 204 and the display area 206. For this reason, the driver, who tries to stay in the range in which the engine 100 is not started, may operate such that the bar end X does not move in the right direction to become close to the boundary portion 210.

Here, the display threshold corresponds to an engine start threshold which is used for the display in the display 172, and thus is distinguished from the engine start threshold which is used for the actual control (see FIG. 2). In the following, in order to distinguish these thresholds, the engine start threshold which is used for the actual control (see FIG. 2) is referred to as a control threshold.

The display threshold inherently indicates the control threshold and is determined based on the control threshold. It is noted that the control threshold is determined based on the various parameters as described with reference to FIG. 2, for example, and thus is not always constant, changing according to the changes in the parameters. The parameters include a parameter (i.e., the first type parameter) which changes due to the operation of the driver and a parameter (i.e., the second type parameter) which changes not due to the operation of the driver. Basically, the display threshold is substantially the same as the control threshold. However, according to the present embodiment, when the control threshold changes, the change manner of the display threshold due to the change in the control threshold differs between the case where the change is due to the operation of the driver and the case where the change is not due to the operation of the driver. Specifically, when the control threshold changes and the factor behind the change is the operation of the driver (i.e., the first type parameter), the display threshold changes in substantially the same manner as the control threshold (i.e., the display threshold changes such that it follows the control threshold without the substantial delay). On the other hand, if the control threshold changes due to a factor other than the operation of the driver (i.e., the second type parameter), the display threshold changes with a delay with respect to the change in the control threshold. Such a delay may be implemented by one of various filtering processes including a moving average process, or may be implemented by "slowing" the change in the control threshold. This prevents a strange feeling of the driver, and can reduce an obstacle against the operations of the driver who tries to stay in the range in which the engine 100 is not started.

For example, when the driver performs the operation for increasing a blower amount of the air conditioner, the bar end X moves greatly due to the change in the first type parameter. At that time, the driver may understand the reason for the change and thus the strange feeling of the driver is unlikely to occur. On the other hand, if the bar end X moves greatly due to the change in the second type parameter (the increase of the temperature of the battery 150, for example) while the driver does not perform corresponding operations in particular, the driver cannot understand the reason for the change and thus the strange feeling of the driver is likely to occur. Further, if, at that time, the driver performs operations to stay in the range in which the engine is not started, for example, such a movement of the bar end X may disturb such operations of the driver.

To the contrary, according to the present embodiment, when the control threshold changes due to the change in the second type parameter, the display threshold changes slowly, thereby preventing the problem (the strange feeling of the driver, etc.) which would occur if the display threshold changes in substantially the same manner as the control threshold. For example, if the display threshold changes slowly, the driver does not substantially notice the change, thereby reducing the strange feeling of the driver. Further, if the display threshold changes slowly, the operations of the driver who tries to stay in the range in which the engine 100 is not started are not disturbed. Further, since the position of the bar end X changes slowly, undesired movements such as chattering or the like are prevented, thereby reducing the obstacle against the operations of the driver.

Figure 4:
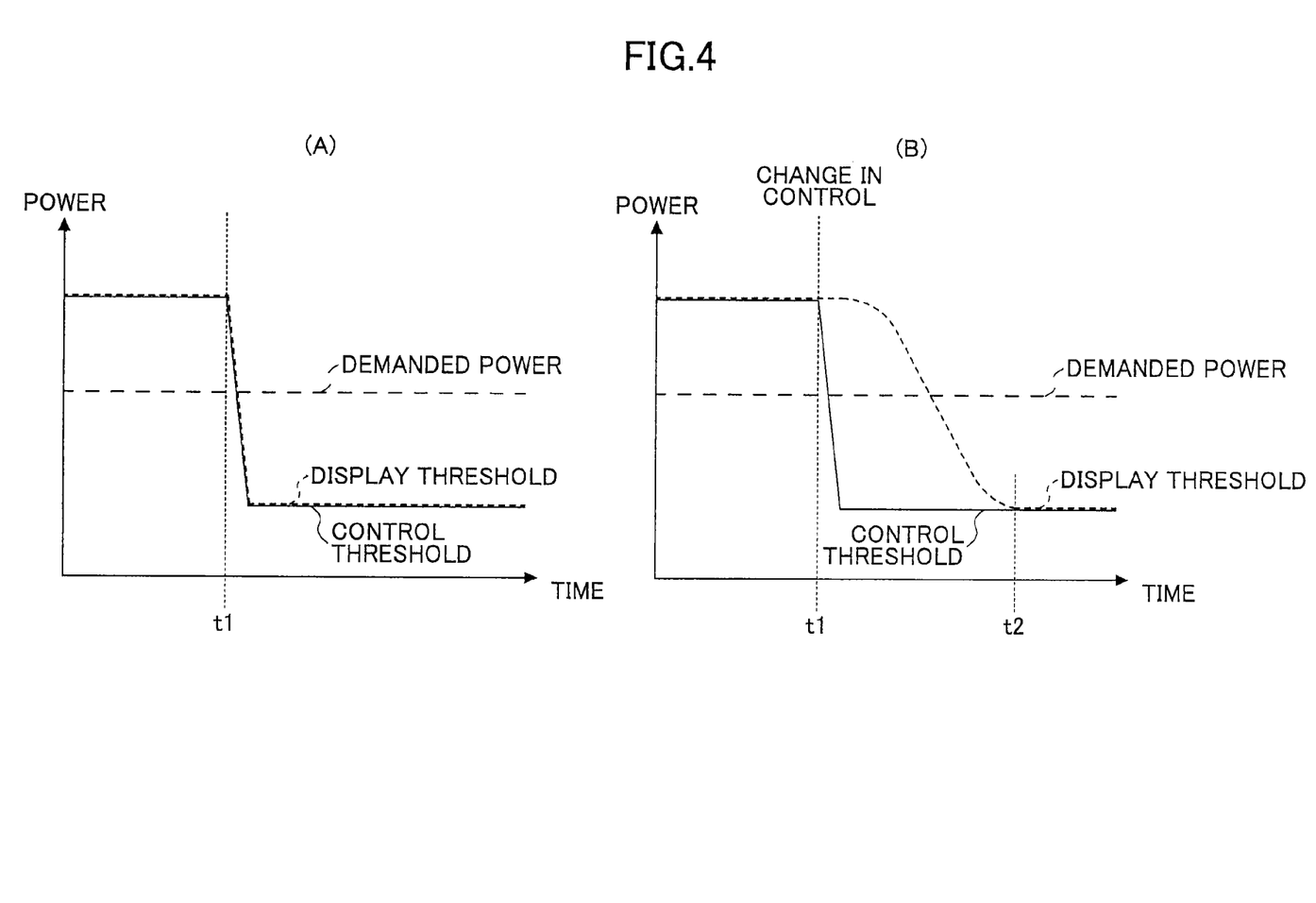
FIG. 4 is a diagram for illustrating an example of a change manner of a display threshold when a control threshold changes.
Figure 5:
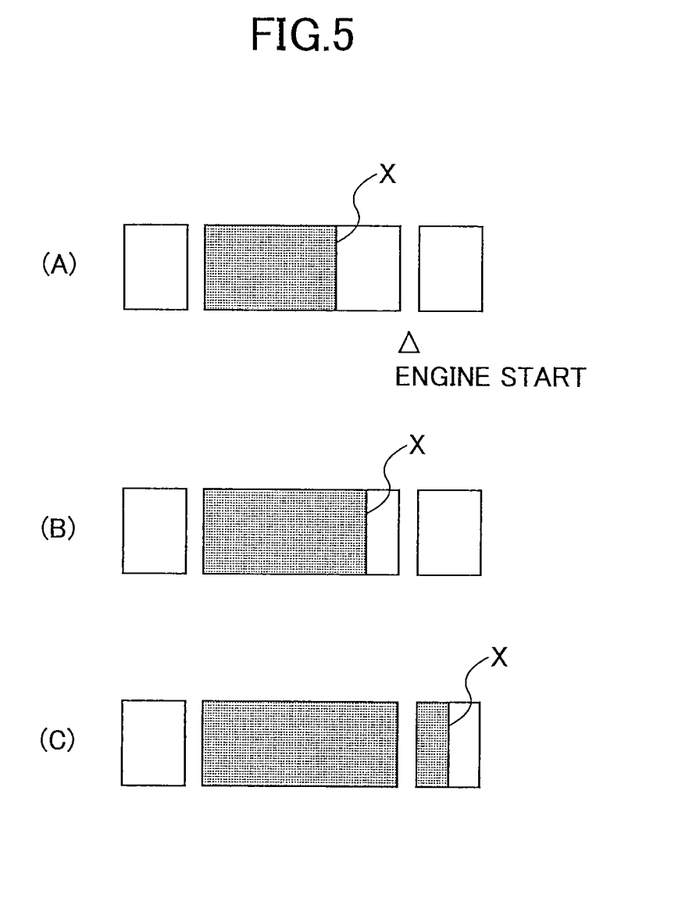
FIG. 5 is a diagram for illustrating an example of a change manner of a display in a display 172.

FIG. 4 is a diagram for illustrating an example of a change manner (time series) of the display threshold when the control threshold changes, in which in (A) an example of the change manner of the display threshold when the control threshold changes due to the operation of the driver is illustrated and in (B) an example of the change manner of the display threshold when the control threshold changes due to a factor other than the operation of the driver is illustrated. It is noted that in the examples as illustrated in FIG. 4(A) and FIG. 4(B) it is assumed that the driver keeps the constant operation amount of the accelerator pedal, for example, and thus the demanded power is substantially constant. FIG. 5 is a diagram associated with FIG. 4 and for illustrates an example of a change manner of a display in the display 172. It is noted that FIG. 5 illustrates a case where the display example illustrated in FIG. 3 is applied as an example.

In the example illustrated in FIG. 4(A), at the time t1 the driver performs the operation which causes the first type parameter to change greatly (the operation for changing the set temperature greatly, for example). Correspondingly, the control threshold decreases greatly. In other words, the control threshold changes greatly such that the engine is started more easily. Due to the decreased control threshold, immediately after the time t1, the demanded power exceeds the control threshold and thus the engine 100 is started. At that time, the display threshold changes in substantially the same manner as the control threshold, as illustrated in FIG. 4(A). Thus, in the example illustrated in FIG. 4(A), the display in the display 172 directly changes from a display status illustrated in FIG. 5(A) to a display status illustrated in FIG. 5(C) before and after the time t1, respectively. In other words, immediately after the time t1 the bar end X moves greatly and instantaneously in the right direction from the position of the display status illustrated in FIG. 5(A) to be in the display area 206 as illustrated in FIG. 5(C). In this way, if the control threshold changes due to the operation of the driver, the display in the display 172 changes at timing which is synchronized with the actual control (timing when the engine 100 is started, in particular).

In the example illustrated in FIG. 4(B), at the time t1, the great change in the second type parameter (an event in which the temperature of the inverter for driving the second MG 120 becomes high, for example) occurs. Correspondingly, the control threshold decreases greatly. In other words, the control threshold changes greatly such that the engine 100 is started more easily. It is noted that the change manner of the control threshold itself is the same as the example illustrated in FIG. 4(A). As is the case with the example illustrated in FIG. 4(A), due to the decreased control threshold, immediately after the time t1, the demanded power exceeds the control threshold and thus the engine 100 is started. At that time, according to the example illustrated in FIG. 4(B), as illustrated by a dotted line, the display threshold changes with a delay with respect to the change in the control threshold. Then, the display threshold becomes substantially the same as the control threshold at the time t2 which is later than the time t1 by an appropriate time, as illustrated in FIG. 4(B). Specifically, the display threshold requires relatively long time (a delay time) from the time t1 to the time t2 to catch up with the control threshold. Thus, in the example illustrated in FIG. 4(B), the display in the display 172 changes from the display status at the time t1 illustrated in FIG. 5(A) to the display status at the time t2 illustrated in FIG. 5(C) via an intermediate display status illustrated in FIG. 5(B). In other words, the bar end X does not move greatly and instantaneously immediately after the time t1 in the right direction from the position of the display status illustrated in FIG. 5(A) but moves slowly in the right direction to be in the display area 206 as illustrated in FIG. 5(C). Thus, if the control threshold changes due to a factor other than the operations of the driver, the display status illustrated in FIG. 5(C) may be formed with a delay with respect to the timing when the engine 100 is started. Here, the delay time of the display threshold (corresponding to time from the time t1 to the time t2) may be adapted in terms of prevention of the strange feeling described above and prevention of the problem due to the delay of the change in the display threshold with respect to the control threshold (for example, strange feeling which would be induced due to difference between the timing when the bar end X is moved in the display area 206 of the display 172 and the timing when the engine 100 is started).

It is noted that in the examples illustrated in FIG. 4(A) and FIG. 4(B), at the time t1, the control threshold changes greatly, which causes the demanded power to exceed the control threshold and engine 100 to start; however, the great change in the control threshold does not necessarily involve the start of the engine 100. For example, there may be a case in which the control threshold changes greatly, which causes the display threshold change with a delay as described above, and then, after a while from the time when the display threshold catches up with the control threshold, the demanded power exceeds the control threshold and engine 100 is started.

Figure 6:
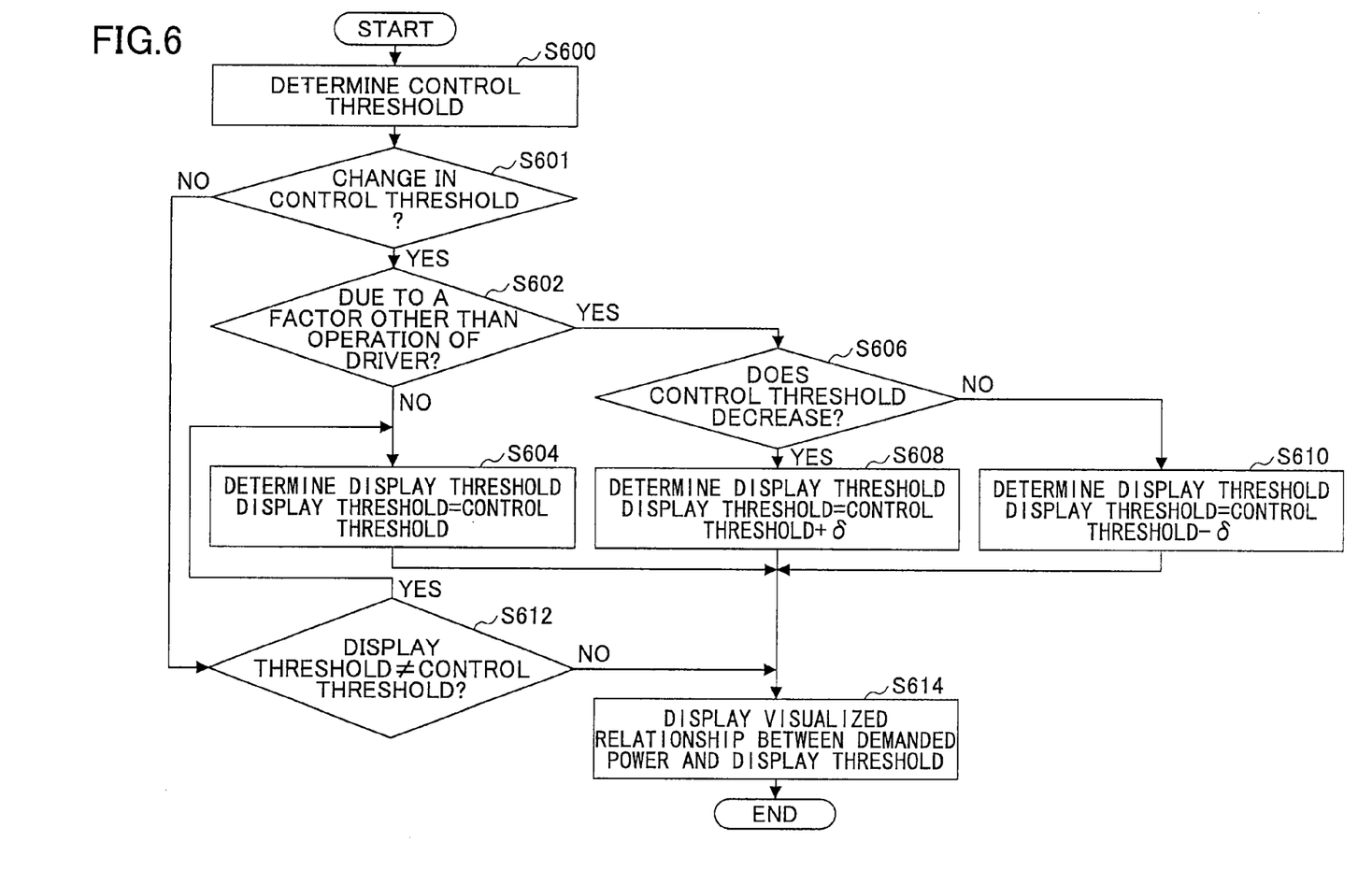
FIG. 6 is an example of a flowchart of a main process executed by an ECU 170.

FIG. 6 is an example of a flowchart of a main process executed by an ECU 170. A process routine illustrated in FIG. 6 may be executed repeatedly at a predetermined cycle during the electric traveling mode.

In step 600, the control threshold is determined based on the current values of the parameters. For example, the control threshold may be determined considering the current vehicle speed as well as other first type parameters and the second type parameters, as described above with reference to FIG. 2. It is noted that the control threshold may be determined by a filtering process using the value at the previous cycle.

In step 601, it is determined whether the control threshold changes with respect to the value at the previous cycle. In this case, it may be determined whether the control threshold changes more than a predetermined change amount with respect to the value at the previous cycle. If the control threshold changes with respect to the value at the previous cycle, the process routine goes to step 602. On the other hand, if the control threshold does not change with respect to the value at the previous cycle, the process routine goes to step 612.

In step 602, it is determined whether the change in the control threshold determined in step 601 is mainly due to a factor other than the operation of the driver. The change of the control threshold mainly due to a factor other than the operation of the driver may be a case where the second type parameter changes. In this case, the change in the control threshold mainly due to a factor other than the operation of the driver may be a case where the second type parameter changes more than a predetermined reference. Further, in the case of the configuration in which the maps (or algorithms) for determining the control threshold are changed (switched), for example, the change in the control threshold mainly due to a factor other than the operation of the driver may be a case where the map (or the algorithm) is changed due to the change in the second type parameter. If the change in the control threshold is mainly due to a factor other than the operation of the driver (if the second type parameter changes, for example), the process routine goes to step 606. On the other hand, if the change in the control threshold is not mainly due to a factor other than the operation of the driver, that is to say, if the change in the control threshold is due to the operation of the driver, the process routine goes to step 604. It is noted that if the change in the control threshold is due to the operation of the driver as well as a factor other than the operation of the drive, this change may or may not be included in the change in the control threshold mainly due to a factor other than the operation of the driver.

In step 604, the display threshold is determined such that it corresponds to the control threshold, and the process routine goes to step 614. In other words, if the change in the control threshold is due to the operation of the driver, the control threshold is adopted as the display threshold as it is.

In step 606, a direction of the change in the control threshold determined in step 601 is determined. In other words, it is determined whether the control threshold is decreased. If the control threshold is decreased, the process routine goes to step 608. On the other hand, if the control threshold is increased, the process routine goes to step 610.

In step 608, the display threshold is set to a value which is greater than the control value by a predetermined value $\delta$, and the process routine goes to step 614. The predetermined value $\delta$ may be a fixed value or a variable value (a half of a difference between the display threshold at the previous cycle and the control threshold, for example). Further, if the value which is greater than the control value by the predetermined value $\delta$ is greater than the display threshold at the previous cycle, the display threshold at the previous cycle may be maintained.

In step 610, the display threshold is set to a value which is smaller than the control value by a predetermined value $\delta$, and the process routine goes to step 614. Similarly, the predetermined value $\delta$ may be a fixed value or a variable value (a half of a difference between the display threshold at the previous cycle and the control threshold, for example). Further, if the value which is smaller than the control value by the predetermined value $\delta$ is smaller than the display threshold at the previous cycle, the display threshold at the previous cycle may be maintained.

In step 612, it is determined whether the control threshold is not equal to the display threshold. For example, if the process of step 608 or step 610 is performed at the previous cycle, there may a case where the control threshold is not equal to the display threshold even if the control threshold does not change from the previous cycle. If the control threshold is not equal to the display threshold, the process routine goes to step 604. In this case, the display threshold is determined (updated) such that it corresponds to the control threshold, and the process routine goes to step 614. On the other hand, if the control threshold is equal to the display threshold, and the process routine goes to step 614, maintaining the display threshold at the previous cycle.

In step 614, the display threshold set (updated) in step 604, 608 or 610 is output (updated) in contrast with the demanded power (see FIG. 3).

Thus, according to the process illustrated in FIG. 6, if the change in the control threshold is due to the operation of the driver, the control threshold is adopted as the display threshold as it is. Therefore, the change in the display threshold directly indicates the change in the control threshold. On the other hand, if the change in the control threshold is mainly due to a factor other than the operation of the driver, the display threshold is set to a value which is greater than or smaller than the control threshold by the predetermined value $\delta$ (see steps 608, 610), and at the next process cycle the display threshold is set to a value which corresponds to the control threshold. In other words, if the change in the control threshold is mainly due to a factor other than the operation of the driver, the display threshold follows the control threshold with a delay time corresponding to one process cycle. It is noted that the delay time does not necessarily correspond to one process cycle, and thus may correspond to more than two process cycles. In this case, the display threshold may be changed such that it approaches to the control threshold gradually on a process cycle basis.

The present invention is disclosed with reference to the preferred embodiments. However, it should be understood that the present invention is not limited to the above-described embodiments, and variations and modifications may be made without departing from the scope of the present invention.

For example, in the embodiment described above, if the change in the control threshold is due to the operation of the driver, the display threshold is changed without delay with respect to the change in the control threshold; however, the display threshold may be changed with a delay with respect to the change in the control threshold even if the change in the control threshold is due to the operation of the driver. In this case, a delay time with respect to the same change amount of the control threshold in the case where the change in the control threshold is due to the operation of the driver may be smaller than that in the case where the change in the control threshold is due to a factor other than the operation of the driver.

Further, in the embodiment described above, the display indicating the ratio of the demanded power to the display threshold is output; however, the display indicating the relationship between these parameters in other manners may be output. For example, the relationship between the display threshold and the demanded power may be displayed such that absolute values of the display threshold and the demanded power are displayed, or difference between the display threshold and the demanded power (a remaining amount left to reach the display threshold) may be displayed in a absolute value or in a ratio (a percentage). Further, the display indicating the ratio of the demanded power to the display threshold is not limited to the illustrated straight bar display and may be any display such as a curved bar display.

Further, in the embodiment described above, the hybrid vehicle is a plug-in hybrid vehicle whose battery 150 can be charged using an external power supply; however, the hybrid vehicle may be of a type in which such charging using the external power supply is not possible.

Further, in the embodiment described above, a particular configuration of the hybrid vehicle illustrated in FIG. 1 is assumed; however, there are various configurations (such as the number of the motors, an arrangement of the engine, the motor(s) and the planetary gear set and a relationship between the engine, the motor(s) and the planetary gear set, etc.) of the hybrid vehicle and thus any configuration of the hybrid vehicle may be adopted. In other words, the hybrid vehicle may only have at least two modes which include an electric traveling mode in which the engine stops and the driving force of the vehicle is generated by the power of the electric motor; and an engine traveling mode in which the driving force of the vehicle is generated by the power of the engine. In other words, the hybrid vehicle may be of any type as long as there is a concept "the engine start threshold". Thus, names of the various modes and the contents thereof may also be arbitrary. For example, the driving force of the vehicle may be generated by the power of the electric motor in the engine traveling mode or the electric motor stops completely in the engine traveling mode.

Further, in the embodiment described above, the operations of the driver are considered; however, operations of other occupants (for example, an operation of the air conditioner) may induce change in the control threshold. Thus, the operations of occupants other than the driver may be considered as is the case with the operations of the driver.

What is claimed is:

1. A vehicle status display apparatus of a hybrid vehicle, comprising:
    a display configured to output a display related to a threshold indicating an engine start criterion under a traveling status using an electric motor; and
    a processing device configured to, when the threshold changes, change the display due to the change of the threshold such that a change manner of the display in a case where the threshold changes due to an operation of a vehicle's occupant is different from a change manner of the display in a case where the threshold changes due to a factor other than the operation of the vehicle's occupant.

2. The vehicle status display apparatus of claim 1, wherein the processing device makes the change manner of the display in the case where the threshold changes due to the factor other than the operation of the vehicle's occupant slower than that in the case where the threshold changes due to the operation of the vehicle's occupant.

3. The vehicle status display apparatus of claim 1, wherein the display indicates a relationship between a parameter related to a drive demand amount, which is determined based on an operation amount of an accelerator pedal, and the threshold, and
    the processing device makes a change manner of the relationship between the parameter and the threshold indicated by the display in the case where the threshold changes due to the factor other than the operation of the vehicle's occupant slower than that in the case where the threshold changes due to the operation of the vehicle's occupant.

4. The vehicle status display apparatus of claim 2, wherein the display indicates a relationship between a parameter related to a drive demand amount, which is determined based on an operation amount of an accelerator pedal, and the threshold, and
    the processing device makes a change manner of the relationship between the parameter and the threshold indicated by the display in the case where the threshold changes due to the factor other than the operation of the vehicle's occupant slower than that in the case where the threshold changes due to the operation of the vehicle's occupant.

5. The vehicle status display apparatus of claim 1, wherein the display indicates a display threshold which is set based on the threshold, and
    when the threshold changes, the display threshold follows the change of the threshold with a delay time, the delay time in the case where the threshold changes due to the factor other than the operation of the vehicle's occupant being longer than that in the case where the threshold changes due to the operation of the vehicle's occupant.

6. The vehicle status display apparatus of claim 2, wherein the display indicates a display threshold which is set based on the threshold, and
    when the threshold changes, the display threshold follows the change of the threshold with a delay time, the delay time in the case where the threshold changes due to the factor other than the operation of the vehicle's occupant being longer than that in the case where the threshold changes due to the operation of the vehicle's occupant.

7. The vehicle status display apparatus of claim 3, wherein the display indicates a display threshold which is set based on the threshold, and
    when the threshold changes, the display threshold follows the change of the threshold with a delay time, the delay time in the case where the threshold changes due to the factor other than the operation of the vehicle's occupant being longer than that in the case where the threshold changes due to the operation of the vehicle's occupant.

8. The vehicle status display apparatus of claim 4, wherein the display indicates a display threshold which is set based on the threshold, and
    when the threshold changes, the display threshold follows the change of the threshold with a delay time, the delay time in the case where the threshold changes due to the factor other than the operation of the vehicle's occupant being longer than that in the case where the threshold changes due to the operation of the vehicle's occupant.

9. The vehicle status display apparatus of claim 1, wherein the factor other than the operation of the vehicle's occupant is a temperature of at least one of a battery in a hybrid system; the electric motor which operates with power from the battery to generate a drive force for the vehicle; and an inverter for controlling operations of the electric motor.

10. The vehicle status display apparatus of claim 2, wherein the factor other than the operation of the vehicle's occupant is a temperature of at least one of a battery in a hybrid system; the electric motor which operates with power from the battery to generate a drive force for the vehicle; and an inverter for controlling operations of the electric motor.

11. The vehicle status display apparatus of claim 3, wherein the factor other than the operation of the vehicle's occupant is a temperature of at least one of a battery in a hybrid system; the electric motor which operates with power from the battery to generate a drive force for the vehicle; and an inverter for controlling operations of the electric motor.

12. The vehicle status display apparatus of claim 4, wherein the factor other than the operation of the vehicle's occupant is a temperature of at least one of a battery in a hybrid system; the electric motor which operates with power from the battery to generate a drive force for the vehicle; and an inverter for controlling operations of the electric motor.

13. The vehicle status display apparatus of claim 5, wherein the factor other than the operation of the vehicle's occupant is a temperature of at least one of a battery in a hybrid system; the electric motor which operates with power from the battery to generate a drive force for the vehicle; and an inverter for controlling operations of the electric motor.

14. The vehicle status display apparatus of claim 6, wherein the factor other than the operation of the vehicle's occupant is a temperature of at least one of a battery in a hybrid system; the electric motor which operates with power from the battery to generate a drive force for the vehicle; and an inverter for controlling operations of the electric motor.

15. The vehicle status display apparatus of claim 7, wherein the factor other than the operation of the vehicle's occupant is a temperature of at least one of a battery in a hybrid system; the electric motor which operates with power from the battery to generate a drive force for the vehicle; and an inverter for controlling operations of the electric motor.

16. The vehicle status display apparatus of claim 8, wherein the factor other than the operation of the vehicle's occupant is a temperature of at least one of a battery in a hybrid system; the electric motor which operates with power from the battery to generate a drive force for the vehicle; and an inverter for controlling operations of the electric motor.

* * * * *